(12) United States Patent
Lorenz et al.

(10) Patent No.: US 12,438,316 B2
(45) Date of Patent: Oct. 7, 2025

(54) USE OF LINES IN A LIGHTING STRIP SYSTEM FOR DATA COMMUNICATION

(71) Applicant: ZUMTOBEL LIGHTING GMBH, Dornbirn (AT)

(72) Inventors: Stefan Lorenz, Schwarzenbruck (DE); Gerald Ladstätter, Klaus (AT); Michail Angelov, Finnland (FI)

(73) Assignee: Zumtobel Lighting GmbH, Dornbirn (AT)

( * ) Notice: Subject to any disclaimer, the term of this patent is extended or adjusted under 35 U.S.C. 154(b) by 328 days.

(21) Appl. No.: 18/251,872

(22) PCT Filed: Nov. 25, 2021

(86) PCT No.: PCT/EP2021/082992
§ 371 (c)(1),
(2) Date: May 4, 2023

(87) PCT Pub. No.: WO2022/112413
PCT Pub. Date: Jun. 2, 2022

(65) Prior Publication Data
US 2024/0011610 A1  Jan. 11, 2024

(30) Foreign Application Priority Data
Nov. 30, 2020 (DE) .................... 10 2020 131 626.7

(51) Int. Cl.
*F21V 21/00* (2006.01)
*F21V 21/005* (2006.01)
(Continued)

(52) U.S. Cl.
CPC .......... *H01R 25/14* (2013.01); *F21V 21/005* (2013.01); *F21S 8/038* (2013.01)

(58) Field of Classification Search
CPC .......... F21V 21/005; F21S 4/28; H01R 25/14
See application file for complete search history.

(56) References Cited

U.S. PATENT DOCUMENTS 3,144,505 A * 8/1964 Fork ................. H02G 3/283
                                                  439/108
3,757,063 A * 9/1973 Hart ................. H01R 25/142
                                                  200/51.07
(Continued)

FOREIGN PATENT DOCUMENTS

DE      202017102463 U1    7/2018
WO        2017194310 A1   11/2017

OTHER PUBLICATIONS

PCT/EP2021/082992, International Search Report and Written Opinion, Mar. 7, 2022, 14 pages, and English Translation, 7 pages.

*Primary Examiner* — Phuong Chi Thi Nguyen
(74) *Attorney, Agent, or Firm* — Andrus Intellectual Property Law, LLP

(57) ABSTRACT

The invention relates to a lighting strip system (1) comprising a support rail system (10) and luminaires (200) and further components (300) connected thereto, wherein electrical lines (120) are arranged inside the support rail (100), and wherein the electrical lines (120) comprise both a main power supply line (130) and other lines (180). The support rail system furthermore comprises a data transceiver (20) for modulating further data signals D onto at least one of the other lines (180). A method for data communication within the lighting strip system (1) is also specified.

15 Claims, 3 Drawing Sheets

(51) Int. Cl.
*H01R 25/14* (2006.01)
*F21S 8/00* (2006.01)

(56) References Cited

U.S. PATENT DOCUMENTS

| | | | | |
|---|---|---|---|---|
| 3,848,715 A | * | 11/1974 | Hesse | H01R 25/142 |
| | | | | 439/119 |
| 4,003,618 A | * | 1/1977 | Booty | H01R 25/162 |
| | | | | 439/113 |
| 4,121,879 A | * | 10/1978 | Olsen | H01R 25/142 |
| | | | | 439/246 |
| 4,776,809 A | * | 10/1988 | Hall | H01R 25/142 |
| | | | | 248/222.52 |
| 4,919,625 A | * | 4/1990 | Coutre | H01R 25/14 |
| | | | | 439/118 |
| 5,336,849 A | * | 8/1994 | Whitney | H02G 3/0425 |
| | | | | 52/287.1 |
| 6,686,841 B1 | * | 2/2004 | Busch | G08B 13/1463 |
| | | | | 340/687 |
| 8,807,796 B2 | * | 8/2014 | Li | H05B 47/18 |
| | | | | 362/249.05 |
| 9,149,350 B2 | * | 10/2015 | Ahearn | A61C 19/00 |
| 2003/0222587 A1 | | 12/2003 | Dowling et al. | |
| 2014/0111094 A1 | | 4/2014 | Kodama et al. | |

\* cited by examiner

USE OF LINES IN A LIGHTING STRIP SYSTEM FOR DATA COMMUNICATION

CROSS-REFERENCE TO RELATED APPLICATION

The present application is the U.S. national stage application of international application PCT/EP2021/082992 filed Nov. 25, 2021, which international application was published on Jun. 2, 2022 as International Publication WO 2022/112413 A1. The international application claims priority to German Patent Application 10 2020 131 626.7, filed Nov. 30, 2020.

TECHNICAL FIELD OF THE INVENTION

The present invention relates to a support rail system comprising a support rail and contactable electrical lines running within the support rail, wherein luminaires and other electrical consumers or further components, such as sensors, speakers or cameras, can be connected to the support rail system such that the luminaires and the further components are coupled to electrical lines of the support rail. Furthermore, a lighting strip system, which also comprises electrical consumers in addition to the support rail system, and a method for data communication within the lighting strip system are specified.

BACKGROUND OF THE INVENTION

Support rails having a support rail profile and a busbar held in the support rail profile are known from the prior art and are, for example, used for realizing elongate lighting strip systems. A known lighting strip system is sold by the applicant under the name "TECTON" and is characterized in that luminaires or other electrical consumers can be flexibly positioned on the support rail over the entire length of the system, wherein the luminaires or other electrical consumers are mechanically coupled to the support rail and are also electrically connected to the electrical lines arranged in the interior of the support rail.

In general, illumination systems having a support rail system are to be as flexibly adaptable as possible in order to be used in a wide variety of application scenarios. Often, existing support rail systems are subsequently equipped with further components than those originally provided, wherein the electrical lines arranged in the interior of the support rail cannot be adapted to the new scenario without considerable effort. In this respect, newly added further components are to be designed such that they can be controlled via the existing communication lines of the illumination system, for example via a DALI BUS.

It is known from the prior art that data signals which can be received and processed by a correspondingly designed further component can additionally be transmitted via the main power supply line. In this case, a data signal to be transmitted is placed on the main power supply line of the illumination system, wherein the corresponding further components are designed to also receive and process the additionally transmitted data signals in addition supplying the current or voltage via the main power supply line. This type of data communication via the main power supply line is also known as power line communication (PLC). It is also conceivable to control further components that are subsequently coupled to the support rail wirelessly, so that the further components are only to be coupled to a power supply of the support rail system.

However, the previous variants for supplying further components with data signals have proven to be disadvantageous in practice. Thus, the use of dedicated signal lines, for example DALI lines for DALI signals, for controlling the further components via, for example, the DALI Bus is only provided for illumination components, so that the illumination system or lighting strip system is considerably limited in terms of design. Furthermore, these dedicated signal lines have a slow data transmission, as a result of which this type of data transmission is not suitable for other applications anyway, such as, for example, the transmission of video data or Internet connectivity. Although the use of wireless data transmission involves a possibility of fast data transmission, the risk of interception and/or manipulation of the data by unauthorized persons is increased. Furthermore, there is the risk that the increasing number of wireless communication devices interferes with the communication of the further components, because the usual wireless communication types use the same frequency band.

The possibility of data communication via the main power supply line (power line communication) is less flexible, because this type of communication is limited to power supply lines, so that the number of power lines present in the system is identical to the number of data connections required, so that existing systems cannot easily be adapted. Furthermore, the electrical power conducted on the main power supply line is an interference source for further data signals, so that the further data signals present in the power line communication on the main power supply line are weakened, distorted or even rendered unreadable, as a result of which the reliability of the transmitted data signals decreases. In addition, the further components, which exchange data signals via power line communication, must be capable of handling high currents, because the components each have to be connected to the main power supply line itself, which makes the individual components expensive, bulky and heavy.

SUMMARY OF THE INVENTION

The present invention is therefore based on the object of specifying an improved support rail system, an improved lighting strip system and an improved method for data communication within a lighting strip system.

This object is achieved by a support rail system, a lighting strip system and a method for data communication within a lighting strip system having the features of the independent claims. Advantageous developments and particular embodiment types of the invention are specified in the dependent claims.

According to the invention, a support rail system is provided which has at least one support rail for fastening luminaires and further components on the support rail, and has contactable electrical lines running in the support rail. In this case, the electrical lines have both a main power supply line and other lines, wherein the other lines comprise a light communication line for transmitting light communication signals, in particular DALI signals, and/or a low voltage supply line, in particular an SELV line, and/or a non-continuously used supply line, in particular an emergency power supply line and/or a switched supply line, and/or a different data line, in particular an audio signal line. Furthermore, the support rail system has a data connection for transferring further data signals, and a data transceiver for modulating the further data signals onto at least one of the other lines, wherein this at least one other line is thus a line used to transmit the further data signals.

A support rail system formed in this way consequently allows data signals to be transmitted via at least one of the other lines, so that the task spectrum of a support rail system with its limited number of lines, which are in particular already provided for a task—such as DALI lines or SELV lines—is no longer limited by the number of existing lines. In this case, the transmission of the further data signals is not tied to the number of main power supply lines, wherein the dimensioning of both the data transceiver and the further components is thus also compact and lightweight, because high-power components can be dispensed with. The data transceiver thus forms the key point for transmitting the further data signals both within the support rail system and for communication toward the data connection of the support rail system. The data transfer via the line used to transmit the further data signals in this case allows a high bandwidth, so that in particular video transmissions, multimedia data or Internet data are transmitted in a simple, reliable and uncomplicated manner. The decisive factor is that for the transmission of the further data signals no new lines are inserted into the support rail system; rather, already existing and conventional lines of the support rail system, alongside their actual task, are also used for the transmission of the further data signals, so that this at least one line used to transmit the further data signals has a double use. Such a support rail system is extremely flexible and in particular allows a plurality of the other lines to be used to transmit the further data signals, in particular different further data signals. In this case, the data transceiver of the support rail system can be flexibly and easily connected to the desired line for transmitting the further data signals.

In a particularly suitable embodiment of the support rail system, the relevant line used to transmit the further data signals has already existing signals, wherein the data transceiver is designed to transfer the further data signals to the already existing signals.

It is thus achieved that the information content of the signals originally already present on the relevant line is substantially not distorted or disturbed, wherein the further data signals are additionally transferred via the same line. For example, the DALI signals on the DALI line would be received and processed by a luminaire connected to the DALI line, while in addition to the DALI signals, further data signals are also transmitted via the DALI line, wherein these further data signals can be received and processed by further components connected to the DALI line.

Furthermore, it can preferably be provided that the further data signals differ from the already existing signal in terms of the signal properties, wherein, for example, the frequency of the two signals can be different. Thus, high-frequency further data signals can in particular be modulated by the data transceiver to a low-frequency, already existing signal (or vice versa), so that the signal information of the already existing signal can be received and evaluated in an undistorted state, while the signal information of the further data signals can also be received and evaluated by the further components.

In one embodiment, the support rail system is designed such that the light communication line is the line used to transmit the further data signals, wherein the already existing signals are the light communication signals, and wherein the further data signals are preferably high-frequency signals and the light communication signals are low-frequency signals, and wherein the data transceiver is preferably designed to modulate these further data signals onto the light communication signals already present on the light communication line. This embodiment is also referred to as a HF-LF configuration.

By means of such an embodiment, the lines for light communication signals which are present in a support rail system for a lighting strip system can also be used for the control and data exchange of the further components. In particular, the low-frequency light communication signals are not disturbed by the high-frequency further data signals, so that the light communication line, which was previously limited to light communication signals, in particular DALI signals, can now also be used for other data types, wherein in particular the communication of the further data signals can take place more quickly than the communication of the light communication signals.

In a further embodiment, the support rail system is designed such that the low voltage supply line is the line used to transmit the further data signals, wherein, in order to modulate the further data signals, the data transceiver is preferably designed to encode the further data signals in the polarity of signals already present on the line used to transmit the further data signals, in particular power supply signals. This embodiment is also referred to as a polarity configuration.

With such an embodiment, the further data signals can be transmitted via the low voltage supply line in a simple and reliable manner, without the electrical power conducted on the low voltage supply line being an interference source for the further data signals. A reliable transmission of the further data signals is thus ensured. In particular, the further data signals may encode in the polarity of the supply lines, in particular the low voltage supply line or SELV line. In this embodiment, the electrical consumers coupled to the low voltage supply line are particularly preferably designed to be insensitive to polarity. What is essential in this embodiment is that the further components are designed to receive and evaluate the further data signals embedded in the polarity.

Furthermore, it is conceivable that the polarity configuration is linked to the HF-LF configuration, wherein it is conceivable for a plurality of the other lines to conduct further data signals, and wherein it is also conceivable for a plurality of different further data signals to be transmitted on a line, wherein further data signals contained in the polarity and additional high-frequency and/or low-frequency further data signals co-exist on one of the other lines, in particular on the low voltage supply line, and are, so to speak, transmitted simultaneously. This enormously increases the flexibility and the capacity of the data transmission within a support rail system.

According to a further embodiment, the support rail system is characterized in that the non-continuously used supply line is the line used to transmit the further data signals, wherein the data transceiver is preferably designed to modulate the further data signals onto the non-continuously used supply line only during normal operation of the support rail system.

With such an embodiment, lines within the support rail system that are not used in normal operation and thus do not have any already existing signals in normal operation can be used to transmit the further data signals. In particular, these lines can be connected supply lines or emergency power supply lines or other non-continuously used supply lines. If normal operation is left and the support rail system switches, for example, to an emergency operation with emergency power supply, the transmission of the further data signals is interrupted. This embodiment can preferably also be combined with the two previous embodiments (polarity configuration and/or HF-LF configuration).

According to the invention, a lighting strip system is furthermore provided, wherein the lighting strip system has a support rail system according to the invention and at least one luminaire and one further component which are connected to the support rail system.

Thus, a particularly flexible and widely usable illumination system or lighting strip system is provided, wherein the components and the luminaires are coupled to the electrical lines of the support rail system. Consequently, the components and/or the luminaires can also be supplied with further data signals in addition to the already existing signals of the electrical lines.

In a preferred embodiment, at least one of the further components is connected to the line used to transmit the further data signals, wherein the at least one further component is designed to receive and process the further data signals.

It is thus possible for the further data signals to be received and processed by the at least one further component, wherein it is also possible for at least one luminaire to be coupled to the line used to transmit the further data signals, which, in another embodiment, can itself also receive and process the further data signals.

It is also preferable for the at least one further component to be further designed to modulate further data signals onto the line used to transmit the further data signals.

A further component designed in this way makes it possible to both transmit and receive further data signals via the line used to transmit the further data signals, wherein the data transceiver of the lighting strip system or of the support rail system is likewise designed to both transmit and receive the further data signals. Thus, a particularly versatile and flexibly usable lighting strip system is provided.

Furthermore, the at least one further component may have a dedicated data transceiver for receiving, processing and/or modulating the further data signals.

According to the invention, a method for data communication within a lighting strip system is also provided. In this case, the lighting strip system has at least one support rail for fastening luminaires and further components to the support rail, and at least one luminaire and one further component, wherein contactable electrical lines run within the support rail. In this case, the electrical lines comprise both a main power supply line and other lines, wherein the other lines comprise a light communication line for transmitting light communication signals, in particular DALI signals, and/or a low voltage supply line, in particular an SELV line, and/or a non-continuously used supply line, in particular an emergency power supply line and/or a switched supply line, and/or a different data line, in particular an audio signal line, and wherein the further data signals are modulated onto at least one of the other lines in the lighting strip system, such that this other line is a line used to transmit the further data signals. In addition, at least one of the further components is connected to the line used to transmit the further data signals, wherein the at least one further component receives and processes the further data signals.

Such a method for data communication within a lighting strip system thus enables the flexible and simple expansion or configuration of the lighting strip system to transmit further data signals in such a way that already existing electrical conductors can be used as flexibly, easily and reliably as possible to transmit the further data signals. In addition, the method allows the further data signals to be transmitted in a manner that is as rapid and interference-free as possible.

Preferably, the lighting strip system has a data connection for transferring further data signals and a data transceiver, wherein the data transceiver in the lighting strip system modulates the further data signals onto at least one of the other lines.

Furthermore, it can preferably be provided that the at least one further component itself modulates further data signals onto the line used to transmit the further data signals.

It is thus achieved that the at least one further component cannot only receive and process the further data signals, but can also itself send generated data, such as a video stream or sensor data, as further data signals via the line used to transmit the further data signals, so that a bidirectional communication of the further data signals is made possible.

In a further embodiment, the line used to transmit the further data signals already has signals before the modulation of the further data signals. Furthermore, these already existing signals are preferably low-frequency signals, wherein the further data signals are modulated as high-frequency signals onto the already existing signals, and wherein the further data signals are preferably modulated onto the signals of the light communication line.

In this case, the already existing signals on the line used to transmit the further data signals are not distorted by the further data signals, so that both the already existing signals and the further data signals are present on one line. In the embodiment having the light communication line as a line used to transmit the further data signals, the already existing signals are thus, for example, DALI signals which are used to control luminaires. These already existing communication signals are not disturbed or distorted by the further data signals in this case, wherein the further data signals are preferably superimposed on the already existing signals at a higher frequency. Thus, the further data signals can be transmitted more efficiently and more quickly, with the validity of the individual signals also being maintained.

According to a further embodiment, the further data signals are encoded in the polarity of signals already present on the line used to transmit the further data signals, wherein the further data signals are preferably modulated onto the signals of the low voltage supply line.

Such a configuration of the modulation of the further data signals by changing the polarity of the already existing signals allows a particularly simple and reliable transmission of the further data signals.

In another embodiment, the further data signals are modulated onto the non-continuously used supply line, wherein the further data signals are preferably modulated onto the non-continuously used supply line only during normal operation of the lighting strip system.

A method configured in this way offers the advantage that lines which would have no signals in normal operation are now used by the data transceiver for the transmission of the further data signals to the corresponding line. If the normal operation is terminated and, for example, an emergency operation or another operating state is reached, the transmission of the further data signals stops. Such an embodiment increases the efficiency of the data communication method, because the only non-continuously used lines are now also used in normal operation.

Furthermore, it can preferably be provided that a plurality of the other lines are used to transmit the further data signals such that the lighting strip system has a plurality of lines used to transmit the further data signals.

As a result, the method for data communication can also be flexible and scalable, wherein the lines used to transmit the further data signals can be selected depending on the application scenario. Furthermore, it is also conceivable that a plurality of the described embodiments of the method are combined with one another in such a way that a plurality of further data signals are transmitted via a line.

Thus, a particularly flexible and reliable method for data communication within a lighting strip system is provided, as well as an extremely flexible, lightweight and versatile and individually adaptable lighting strip system or support rail system, wherein, depending on the application scenario, various further components and luminaires can be coupled to the support rail system and can also be controlled via the lines arranged in the support rail system, wherein further data signals are modulated onto one of the electrical lines for this purpose.

BRIEF DESCRIPTION OF THE DRAWINGS

The invention will be explained in more detail below on the basis of embodiments and with reference to the drawings, in which.

DETAILED DESCRIPTION OF THE PREFERRED EMBODIMENT

Figure 1:
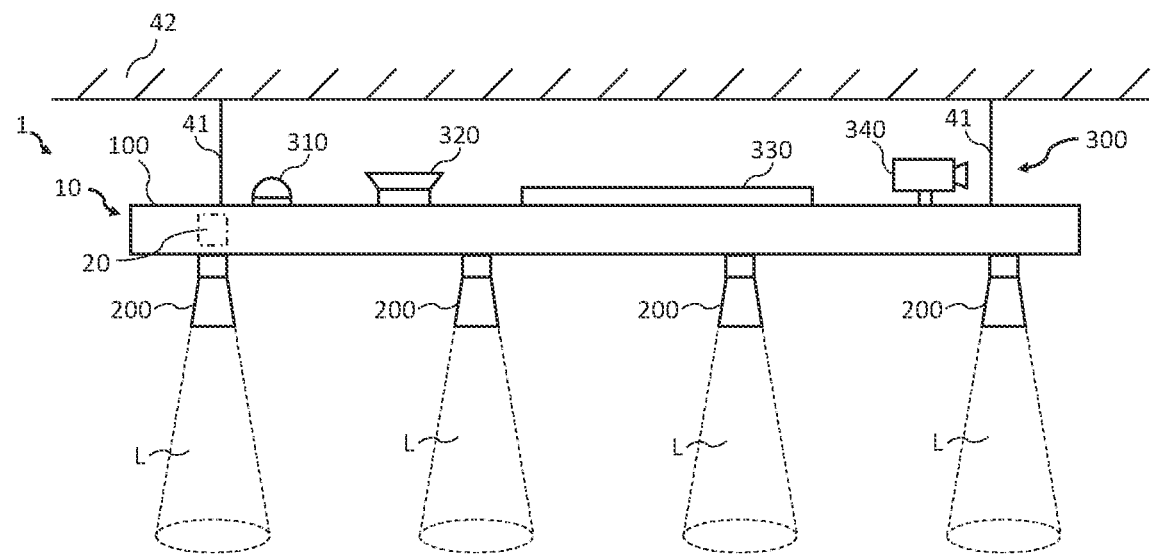
FIG. 1 is a side view of an embodiment of a lighting strip system according to the invention, comprising a support rail system and further components and luminaires coupled therewith.

The lighting strip system 1 shown in FIG. 1 has a support rail system 10 and luminaires 200 coupled to the support rail system 10 and further components 300. In the illustrated embodiment, the lighting strip system 1 is an illumination system suspended from the ceiling 42 via the cables 41. In this case, it can be provided that the lighting strip system 1 is supplied with current and other communication signals via the cables 41. However, it is also conceivable that the support rail system 10 or the lighting strip system 1 is mounted directly on the ceiling 42 or on a wall. In this case, the luminaires 200 each emit the light L.

The support rail 100 is a central element of the lighting strip system 1 or the support rail system 10, wherein all electrical consumers of the lighting strip system 1 are coupled to the support rail 100. In the illustrated embodiment of the lighting strip system 1 in FIG. 1, a plurality of luminaires 200 are arranged on an underside of the support rail 100, further components 300 being fastened to the upper side of the support rail 100. Of course, the luminaires 200 and/or the further components 300 may also be arranged on a side face and/or on an end face of the support rail 100.

The luminaires 200 are shown in FIG. 1 as luminaires for direct illumination, wherein, of course, luminaires for accent illumination, emergency luminaires and/or luminaires for indirect illumination are also conceivable as luminaires 200.

In the illustrated embodiment, the lighting strip system 1 has a plurality of further components 300, wherein in particular a sensor 310, a speaker 320, a camera 340, and a networked luminaire 330, which is designed as a luminaire for indirect illumination, are shown. However, other embodiments of the further components 300 are naturally also conceivable, such as a display, a WLAN access point or others.

Figure 2:
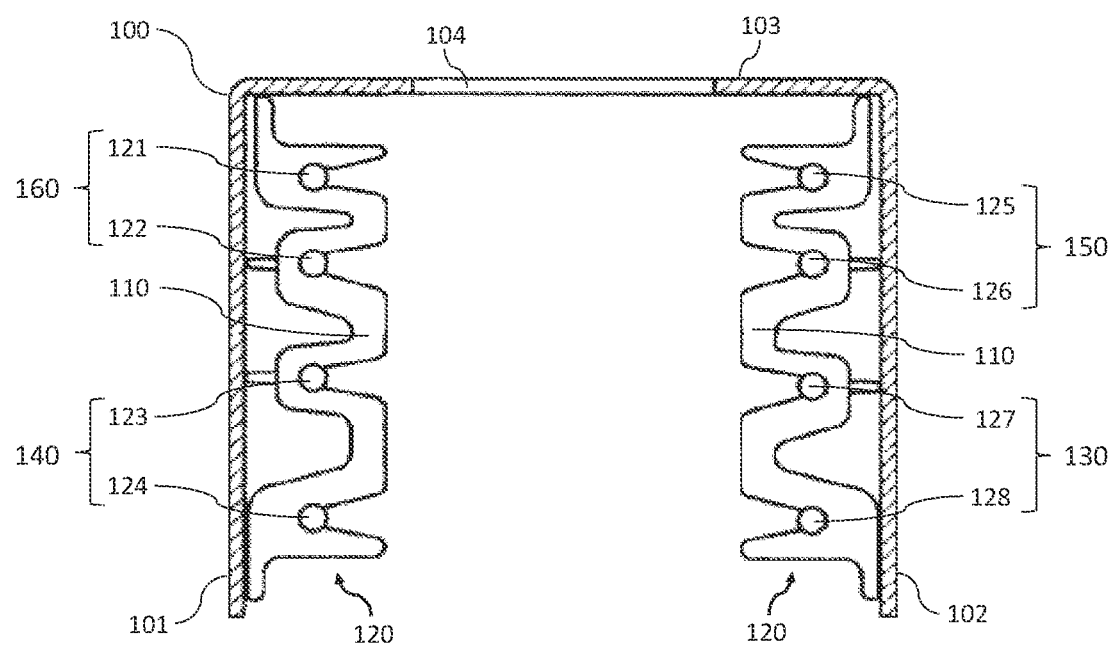
FIG. 2 is a sectional view of an embodiment of a support rail according to the invention, comprising contactable electrical lines running within the support rail.

Contactable electrical lines 120, which are shown by way of example in FIG. 2, run within the interior of the support rail 100. FIG. 2 shows a cross section through an embodiment of a support rail 100, wherein neither luminaires 200 nor further components 300 which are coupled to the support rail 100 are shown, for the purpose of simplification. However, by way of example, a recess 104 is shown on the upper side 103 of the support rail 100, via which luminaires 200 and/or further components 300 can be coupled to the support rail 100 both mechanically and electrically. The luminaires 200 and components 300 could, however, also be mounted on a side face 101, 102 of the support rail 100. However, the luminaires 200 and the further components 300 can preferably contact the support rail 100 and the electrical lines 120 from an underside (not shown) of the support rail 100, wherein the underside is arranged opposite the upper side 103.

The electrical lines 120 are preferably coupled to the support rail 100 via a current-conducting profile 110, wherein the current-conducting profile is arranged on the two side faces 101, 102 of the support rail. However, it is also of course conceivable that electrical lines 120 are also arranged on the inner side of the upper side 103, or on the inner side of the underside (not shown) of the support rail 100. The current-conducting profile 110 in this case spaces the individual electrical lines 120 apart from one another and holds them securely in the interior of the support rail 100. The electrical lines 120 together with the current-conducting profile 110 form a busbar.

In the embodiment shown in FIG. 2, the electrical lines 120 have eight cables 121, 122, 123, 124, 125, 126, 127, 128, wherein, by way of example, in each case two of the cables are combined to form a line group. In this case, a plurality of line groups are shown in FIG. 2, which in particular comprise a main power supply line 130, a light communication line 140, a low voltage supply line 150 and a non-continuously used supply line 160. Of course, the electrical lines 120 can also comprise other and multiple cables and line groups, which can be, for example, further data lines, in particular an audio signal line. In the illustrated embodiment, the individual line groups each have two cables, wherein this is only used for simple illustration. Of course, the individual line groups can also comprise a different number of cables.

In this case, a task is already allocated to the electrical lines 120 arranged in the support rail 100 in each case, wherein, for example, the main power supply line 130 is responsible for supplying current/voltage to the support rail system 10 or the lighting strip system 1, while the light communication line 140 is provided for transmitting light communication signals, in particular DALI signals. The low voltage supply line 150, which can in particular be an SELV line, is used as an additional power feed with small voltages, wherein the non-continuously used supply line 160 can in particular be an emergency power supply line and/or a switched supply line, and thus has an electrical signal, for example an emergency voltage or an emergency current and/or a switched current/voltage signal, at least in an operating state of the support rail system 10 or of the lighting strip system 1. It is thus to be noted that in one embodiment the electrical lines 120 arranged in the support rail 100 are already assigned to a task, so that these electrical lines 120 have an electrical signal S at least in one operating state (for example normal operation, emergency operation).

In this case, the electrical lines 120 are not only divisible with regard to the line groups or the different tasks; a distinction is also made between the main power supply line 130 and the other lines 180, which is shown in particular in FIGS. 3 to 6. The other lines 180 thus comprise all other lines of the support rail system 10 or of the lighting strip system 1 that in particular are not a line for the main supply of power, and thus are not a line with high power transmission.

The support rail system 10 further comprises a data connection 171 for transferring further data signals D wherein, for example, one of the cables 41 is connected to the data connection 171 in order to exchange the further data signals D with the support rail system 10 or with the lighting strip system 1. In addition, the support rail system 10 has a data transceiver 20 which is preferably coupled to the data connection 171.

The data transceiver 20 is used to modulate the further data signals D onto at least one of the other lines 180 such that this at least one other line is a line 181 used to transmit the further data signals D. Thus, further data signals D are transmitted via the data transceiver 20 to a selected line 181 of the other lines 180, wherein, according to one embodiment, these further data signals D are then present on the line 181, in particular alongside the electrical signals S already present on the selected line 181, which is shown in a greatly simplified manner in the diagram of FIG. 6.

The further data signals D can be a wide variety of data signals, wherein in particular audio data, Ethernet data, video data, sensor data or other data can be provided.

Figure 6:
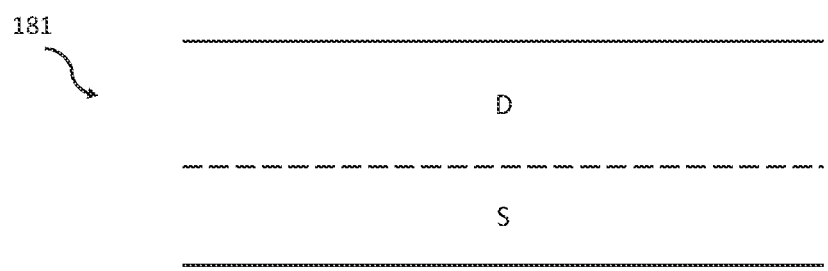
FIG. 6 is a simplified illustration of signals present on a line used to transmit the further data signals.

FIG. 6 shows the line 181 used to transmit the further data signals D, wherein an already existing signal S is present thereon, and wherein the further data signals D are modulated or transferred by the data transceiver 20 onto the existing signals S, wherein the information content of the signals S is not disturbed or distorted. Thus, it is achieved that, in a lighting strip system 1, for example, a luminaire 200 connected to the line 181 used to transmit the further data signals D can correctly receive and process the signals S, which can be in particular DALI signals, while, for example, a further component 300 which is also connected to the line 181 used to transmit the further data signals D can correctly receive and process the further data signals D. Thus, the line 181 can be referred to as a double-use line, because, in addition to the original task of transmitting the signals S, as a result of the modulation of the further data signals D onto the line 181, two data signal information items S and D are now present on the line, which items can be received and processed by the electrical consumers of the lighting strip system 1.

Figure 3:
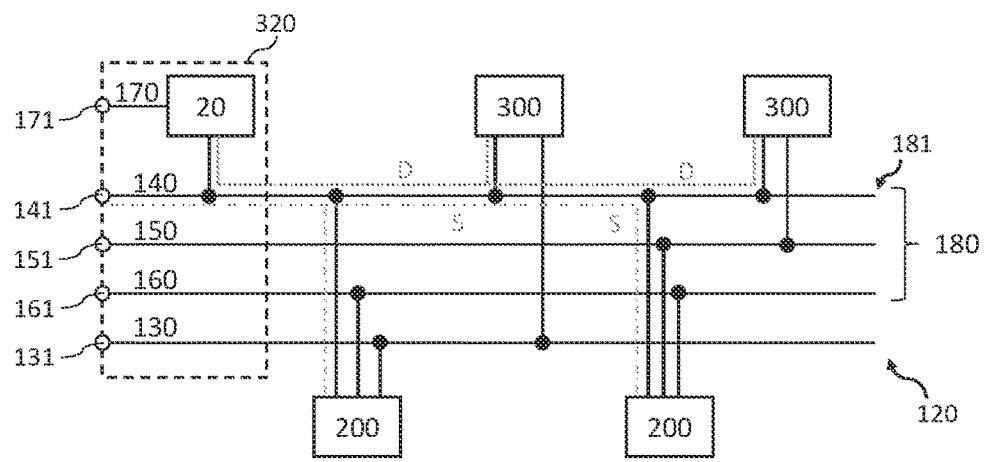
FIG. 3-5 are diagrams of embodiments of a wiring diagram of contactable electrical lines running within an embodiment of a support rail according to the invention.
Figure 4:
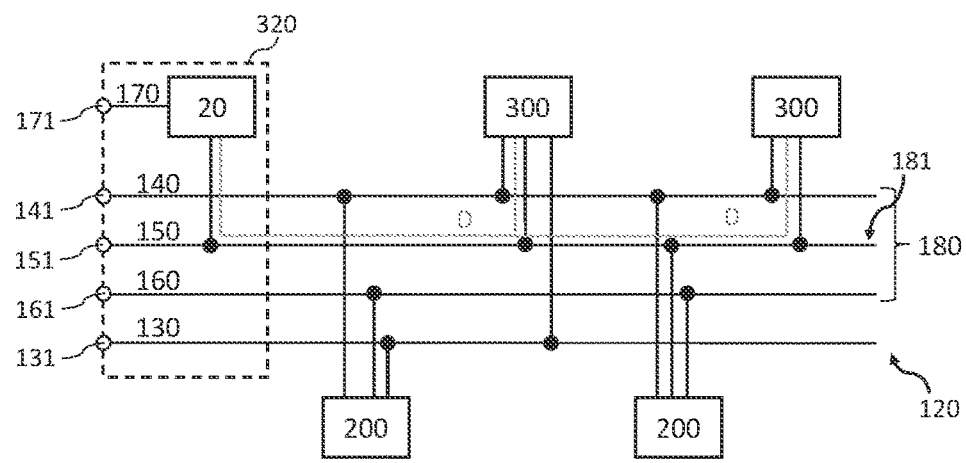
Figure 5:
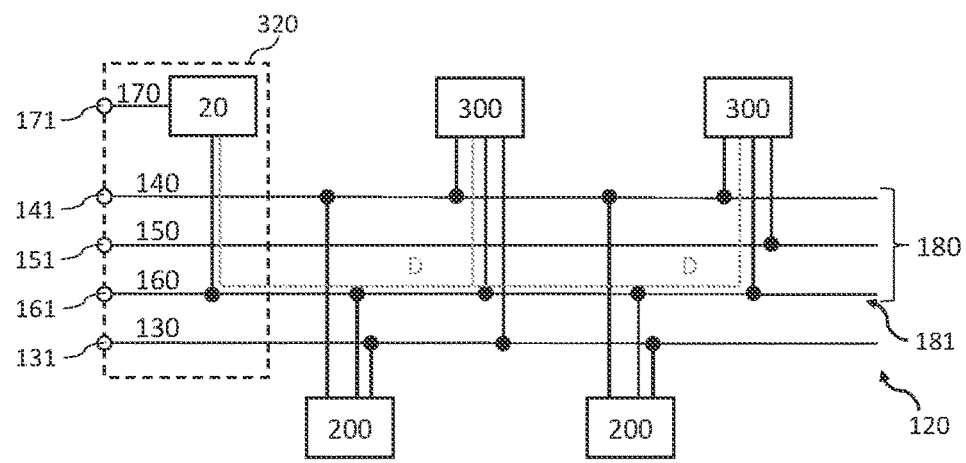

FIGS. 3 to 5 show various embodiments of a method for data communication in a lighting strip system 1, wherein the electrical lines 120, which are arranged in the interior of the support rail 100, and electrical consumers such as luminaires 200 and further components 300 are always shown.

In addition to the main power supply line 130, the other lines 180 are also shown here, wherein in FIGS. 3, 4 and 5 another of the other lines 180 is in each case the line 181 used to transmit the further data signals D. The various embodiments of FIGS. 3 to 5 explain different ways of modulating the further data signals D onto the respectively selected line 181.

The illustrated luminaires 200 and the further components 300 are in this case connected in FIGS. 3 to 5, by way of example, to different electrical lines 120, wherein other couplings are also conceivable, and the number and connection of the luminaires and further components are of course not limited to the embodiments shown.

Furthermore, FIGS. 3 to 5 show a busbar feeder 320 which is an interface for connecting electrical cables, wherein, for example, the conductors contained in the cables 41 can be coupled to the busbar feeder 320 from an outer side of the support rail 100, and wherein the electrical lines in the interior of the support rail 100 are coupled to the busbar feeder 320 from an inner side of the support rail 100. In this case, the busbar feeder 320 can have a plurality of electrical connections 131, 141, 151, 161, 171, wherein in particular the data connection 171 can be part of the busbar feeder 320. Furthermore, the data transceiver 20 may be contained in the busbar feeder 320.

However, the data connection 171 and/or the data transceiver 20 may also not be contained in the busbar feeder 320, but instead positioned in some other way. In particular, the feeding of the data to the line 181 used for transmitting the further data signals D may not be effected by the data transceiver 20 at the point at which the electrical supply of the support rail system 10 is fed in, wherein other points in the support rail 100 or, in a further embodiment, also points outside the support rail 100 can also be provided for this purpose. In this case, the data connection 171 can also be formed directly on the data transceiver 20. Furthermore, it is conceivable that the data connection 171 is contained within the busbar feeder 320, wherein the data transceiver 20 is arranged in some other way, i.e., not within the busbar feeder 320.

In all embodiments of the support rail system 10 or of the lighting strip system 1, a transmission of the further data signals D via the main power supply line 130 is prevented, wherein the further data signals D are transmitted via one of the other lines 180, wherein the other lines 180 are preferably only used for transmitting low power, wherein interference influences are thus prevented by power supply units which are connected in particular to main power supply lines 130, as a result of which the communication of the further data signals D is simplified, improved and made more reliable.

In addition, in one embodiment, at least one of the further components 300 can further be designed to modulate further data signals D onto the line 181 used to transmit the further data signals D. Thus, at least this further component 300 could also emit further data signals D so that bidirectional communication is established. In this case, for example, the at least one further component 300 can be a dedicated data transceiver for receiving, processing and/or modulating the further data signals D. Furthermore, it is of course also possible to provide luminaires 200 which can receive and process the further data signals D.

FIG. 3 shows an embodiment of a wiring diagram of the electrical lines 120, wherein the electrical lines 120 preferably run in the interior of the support rail 100 (not shown). In the illustrated embodiment, the light communication line 140 is the line 181 used to transmit the further data signals D, wherein it is graphically indicated that both already existing signals S and the further data signals D are transferred via the light communication line 140. In particular, these already existing S signals can be DALI signals, which can be received and processed, for example, by the luminaires 200, wherein the further data signals D are received and processed by the components 300.

In this case, the light communication signals, for example DALI signals, are usually slow, low-frequency signals, which are not designed to transmit a large amount of data quickly, as is required in particular for video streams and/or Ethernet applications. The further data signals D are preferably high-frequency signals which are modulated by the data transceiver 20 onto the already existing signals S of the light communication line 140. As a result, both the already existing signals S and the further data signals D are present on the line 181 used to transmit the further data signals D, as is shown schematically in FIG. 6, wherein the two signals are not mutually corrupting and can be correctly received and processed by the corresponding receivers, i.e., the luminaires 200 and/or the further components 300. In particular, the further data signals D, in a frequency that differs from the already existing signals S, may be modulated onto the line 181 used to transmit the further data signals D. The double-use light communication line 140 thus offers a secure, reliable and fast transmission of the further data signals D.

Further types of modulation are also conceivable, wherein, for example, a direct current modulation (DC modulation) of a power bus line could be applied to the light communication line 140, wherein this is advantageous in particular for a communication of the further data signals D at a low speed.

FIG. 4 shows a further embodiment of a wiring diagram of the electrical lines 120, wherein the low voltage supply line 150 in this case is the line 181 used to transmit the further data signals D. In this embodiment, in order to modulate the further data signals D, the data transceiver 20 is preferably designed to encode the further data signals D in the polarity of signals S already present on the line 181 used to transmit the further data signals D (the existing signals S are not explicitly shown in FIGS. 4 and 5). Consequently, in this case at least two different signals are present in parallel on a selected line 181, wherein the two signals do not mutually interfere with one another, as shown schematically in FIG. 6. The modulation method of this type provides a secure, reliable and efficient way of transmitting the further data signals D.

The data transceiver 20 consequently modulates the further data signals D into the polarity of the selected line 181, which in the present example is the low voltage supply line 150. Thus, a further component 300 (or also a luminaire 200) connected to the low voltage supply line 150 can receive both electrical power for operating and further data signals D. Furthermore, a support rail system 10, or a lighting strip system 1, may include both the embodiment shown in FIG. 3 and the embodiment shown in FIG. 4, so that a plurality of further data signals D can be transmitted. Further data signals D encoded in polarity may also be transmitted in addition to other further data signals D modulated in frequency.

FIG. 5 shows a further embodiment of a wiring diagram of the electrical lines 120, wherein in this case the non-continuously used supply line 160 is the line 181 used to transmit the further data signals D. Preferably, the data transceiver 20 is designed to modulate the further data signals D onto the non-continuously used supply line 160 only during normal operation of the support rail system 10. Thus, lines which have hitherto been unused in existing support rail systems 10 or lighting strip systems 1 in normal operation are used to transmit the further data signals, which further increases the efficiency of the support rail system 10 or of the lighting strip system 1. Such an implementation of the modulation by the data transceiver offers an extremely simple, favorable, reliable, fast and interference-free manner of transmitting the further data signals D. If the operating state of the support rail system 10 or of the lighting strip system 1 changes into a non-normal operation, for example into an emergency operation, the transmission of the further data signals D is preferably interrupted. However, similar to the embodiment shown in FIG. 3, the further data signals D may also be transmitted in non-normal operation. In this case, in particular in an embodiment having an emergency power supply line as the non-continuously used supply line 160, which is the line 181 used to transmit the further data signals D, it would likewise be conceivable for the further data signals D to also be modulated onto the emergency power supply line in the emergency power mode. This embodiment offers the advantage that the emergency power supply generally provides significantly less electrical power than the main power supply in normal operation, so that the data transmission of the further data signals D is to be configured only for low power, wherein smaller, lighter and more cost-effective components and filters can be used.

In this case, it is also conceivable that the embodiment shown in FIG. 5 is combined with the embodiments of FIGS. 3 and 4, wherein it is also conceivable overall that a plurality of the other lines 180 are used to transmit the further data signals D in such a way that the lighting strip system 1 or the support rail system 10 comprises a plurality of lines 181 used to transmit the further data signals D. Thus, a plurality of further data signals D, i.e., first/second/third/ . . . further data signals D, can be transmitted within a support rail system 10 or within a lighting strip system 1.

Other lines 180, which were hitherto arranged unused within the support rail 100, may also be used to transmit the further data signals D.

Thus, the solution according to the invention provides a possibility for data communication within a support rail system 10 or lighting strip system 1 that is very simple to implement, extremely reliable, interference-free and flexible. Finally, a method is described which provides data communication by means of further data signals D using the electrical lines 120 that are present in a support rail 100 and are already used, wherein the further data signals D are transferred on a line 181 used to transmit the further data signals D, so that no additional lines have to be added to the support rail 100, wherein the cable channel guide of the electrical lines 120 additionally remains unchanged. Furthermore, lighting strip systems 1 or support rail systems 10 can be produced in a particularly lightweight and compact manner using the solution described in this way, because bulky and heavy components which were required for implementing powerline communication are dispensed with. Furthermore, such lighting strip systems 1, or support rail systems 10, can be used in a particularly versatile and flexible manner, because the further components 300 can be selected and connected to the support rail 100 as required by the situation, wherein the data communication with the described solution is realized in a particularly simple, reliable, fast and interference-free manner.

The invention claimed is:

1. A support rail system (10) comprising:
   at least one support rail (100) for fastening luminaires (200) and further components (300) to the support rail (100),
   contactable electrical lines (120) running within the support rail (100), wherein the electrical lines (120) comprise both a main power supply line (130) and other lines (180), and wherein the other lines (180) comprise one or more of a light communication line (140) for transmitting light communication signals, in particular digital addressable lighting interface (DALI) signals, a low voltage supply line (150), in particular a safety extra low voltage (SELV) line, a non-continuously used supply line (160), in particular an emergency power supply line, a switched supply line, and a different data line, in particular an audio signal line, a data connection (171) for transferring further data signals (D), and a data transceiver (20) for modulating the further data signals (D) onto at least one of the other lines (180) such that this at least one other line is a line (181) used to transmit the further data signals (D).

2. The support rail system according to claim 1, wherein the non-continuously used supply line (160) is the line (181) used to transmit the further data signals (D), wherein the data transceiver (20) is designed to modulate the further data signals (D) onto the non-continuously used supply line (160) only during normal operation of the support rail system (10).

3. The support rail system according to claim 1, wherein a line (181) used to transmit the further data signals (D) has already existing signals (S), wherein the data transceiver (20) is designed to transfer the further data signals (D) to the already existing signals (S).

4. The support rail system according to claim 3, wherein the light communication line (140) is the line (181) used to transmit the further data signals (D), wherein the already existing signals (S) are the light communication signals, and wherein the further data signals (D) are high-frequency signals and the light-communication signals are preferably low-frequency signals, and wherein the data transceiver (20) is designed to modulate said further data signals (D) onto the signals (S) already present on the light communication line (140).

5. The support rail system according to claim 3, wherein the low voltage supply line (150) is the line (181) used to transmit the further data signals (D), wherein, in order to modulate the further data signals (D), the data transceiver (20) is designed to encode the further data signals (D) in the polarity of signals (S) already present on the line (181) used to transmit the further data signals (D).

6. The lighting strip system (1), comprising:

a support rail system (10), and at least one luminaire (200) and one further component (300), which are connected to the support rail system (10);

wherein the support rail system comprises:

at least one support rail (100) for fastening luminaires (200) and further components (300) to the support rail (100), contactable electrical lines (120) running within the support rail (100, wherein the electrical lines 120 comprise both a main power supply line (130) and other lines (180), and wherein the other lines (180) comprise one or more of a light communication line (140) for transmitting light communication signals, in particular digital addressable lighting interface (DALI) signals, a low voltage supply line (150), in particular a safety extra low voltage (SELV)

a data transceiver (20) for modulating the further data signals (D) onto at least one of the other lines (180) each that this at least one other lines is a line (181) used to transmit the further data signals (D).

7. The lighting strip system according to claim 6, wherein at least one of the further components (300) is connected to the line (181) used to transmit the further data signals (D), wherein the at least one further component (300) is designed to receive and process the further data signals (D).

8. The lighting strip system according to claim 6, wherein the at least one further component (300) is further designed to modulate further data signals (D) onto the line (181) used to transmit the further data signals (D).

9. The lighting strip system according to claim 6, wherein the at least one further component (300) has a dedicated data transceiver for receiving, processing and/or modulating the further data signals (D).

10. A method for data communication within a lighting strip system (1), wherein the lighting strip system (1) has at least one support rail (100) for fastening luminaires (200) and further components (300) to the support rail (100), and at least one luminaire (200) and one further component (300), wherein contactable electrical lines (120) run in the support rail (100), and wherein the electrical lines (120) comprise both a main power supply line (130) and other lines (180), and wherein the other lines (180) comprise one or more of a light communication line (140) for transmitting light communication signals, in particular digital addressable lighting interface (DALI) signals, a low voltage supply line (150), in particular a safety extra low voltage (SELV) line, a non-continuously used supply line (160), in particular an emergency power supply line, a switched supply line, and a different data line, in particular an audio signal line, and wherein in the lighting strip system (1) the further data signals (D) are modulated onto at least one of the other lines (180), such that this other line is a line (181) used to transmit the further data signals (D), and wherein at least one of the further components (300) is connected to the line (181) used to transmit the further data signals (D), wherein the at least one further component (300) receives and processes the further data signals (D).

11. The method for data communication according to claim 10, wherein the at least one further component (300) itself modulates further data signals (D) onto the line (181) used to transmit the further data signals (D).

12. The method for data communication according to claim 10, wherein the line (181) used to transmit the further data signals (D) already has signals before the modulation of the further data signals (D), wherein these already present signals (S) are low-frequency signals, wherein the further data signals (D) are modulated as high-frequency signals onto the already present signals (S), and wherein the further data signals (D) are preferably modulated onto the already existing signals (S) of the light communication line (140).

13. The method for data communication according to claim 10, wherein the further data signals (D) are encoded in the polarity of signals (S) already present on the line (181) used to transmit the further data signals (D), and wherein the further data signals (D) are preferably modulated onto the already present signals (S) of the low voltage supply line (150).

14. The method for data communication according to claim 10, wherein the further data signals (D) are modulated onto the non-continuously used supply line (160), wherein the further data signals (D) are modulated onto the non-continuously used supply line (160) only during the normal operation of the lighting strip system (1).

15. The method for data communication according to claim 10, wherein a plurality of the other lines (180) are used to transmit the further data signals (D), such that the lighting strip system (1) has a plurality of lines (181) used to transmit the further data signals (D).

\* \* \* \* \*